Nov. 12, 1968  R. C. BECKWITH ET AL  3,409,922
DOCKBOARD
Filed Feb. 9, 1966  3 Sheets-Sheet 1

INVENTORS
Robert C. Beckwith, &
BY Robert W. Hecker, Jr.

Barnard, McGlynn & Reising
ATTORNEYS

INVENTORS
Robert C. Beckwith, &
BY Robert W. Hecker, Jr.

Barnard, McGlynn & Reising
ATTORNEYS

Nov. 12, 1968  R. C. BECKWITH ET AL  3,409,922
DOCKBOARD
Filed Feb. 9, 1966  3 Sheets-Sheet 3

INVENTORS
Robert C. Beckwith, &
BY Robert W. Hecker, Jr.

Barnard, McGlynn & Reising
ATTORNEYS

United States Patent Office 3,409,922
Patented Nov. 12, 1968

3,409,922
DOCKBOARD
Robert C. Beckwith, Milwaukee, Wis., and Robert W. Hecker, Jr., Clare, Mich., assignors to Loomis Machine Company, Clare, Mich., a corporation of Michigan
Filed Feb. 9, 1966, Ser. No. 526,286
17 Claims. (Cl. 14—71)

ABSTRACT OF THE DISCLOSURE

A dockboard adapted for installation on a loading dock to span the gap between the dock and the bed of a truck which is in position to be loaded or unloaded and, more specifically, to a dockboard including a support structure, a ramp pivotally connected at a first end thereof to the support structure, a ramp lip pivotally connected to the second end of the ramp for movement between a pendent position and an extended cantilevered position, and actuation means for yieldably locking the ramp lip in the extended cantilevered position so that the ramp lip may pivot toward the pendent position when a predetermined force is applied thereto and for unlocking the ramp lip when the ramp pivots to a fixed position below dock level.

---

Normally, in a dockboard of the type to which the instant invention pertains, the extension lip is hinged to the front edge of the ramp and hangs in a pendent position when the dockboard is not in use and the ramp is in its so-called cross traffic or dock level position, in which position the ramp is flush with the upper surface of the dock. The ramp lip is lifted to an extended cantilevered position forming an extension of the ramp when the dockboard is in use so that the ramp lip may rest upon the bed of the truck or the like which is being loaded and unloaded.

Normally, the ramp lip is moved to and locked in the extended cantilevered position during pivotal movement of the ramp relative to the support structure when the dockboard is being positioned for use. That is to say, as a truck, or the like, is backing to a position adjacent the dock, the dockboard is prepared for use by locking the ramp lip in the extended cantilevered position.

A problem occurring in the use of such dockboards is that a truck, or the like, frequently backs into the ramp lip when it is locked in the extended cantilevered position whereby the mechanism and/or linkage supporting the ramp lip in the extended cantilevered position is bent and/or broken as the truck forces the ramp lip to pivot relative to the ramp.

One attempt to solve this problem is the utilization of a dockboard wherein the ramp lip is pivoted to the extended position by a cord which is attached to the support structure at one end and to a crank arm at the other end so that the cord becomes taut as the ramp pivots upwardly to pivot the crank arm, which in turn raises the ramp lip to the extended position. As the ramp lip in such a structure is pivoted to the extended position, a telescoping spring assembly slides through an aperture in a member depending from the ramp and a locking plate is pivoted by a second cord to cover the aperture so that the telescoping spring assembly abuts the plate to yieldably support the ramp lip in the extended position when the ramp is pivoted downwardly and the tautness in the lip lifting cord is released. Such dockboards have a major disadvantage in that the ramp lip is yieldably supported only until the ramp lip comes to rest upon the bed of a truck. That is to say, when the ramp lip rests on the bed of a truck, the force resulting from the weight of the ramp lip is removed from the telescoping spring assembly so that the forces exerted thereby on the locking plate are removed and the locking plate falls to uncover the aperture to allow the telescoping spring assembly to slide therethrough such that the ramp lip is no longer yieldably supported. Consequently, when the truck moves away, the ramp lip will pivot to the pendent position and the ramp must again be raised or recycled to reposition the ramp lip in the extended position where it is yieldably supported. Thus, in such a dockboard, the ramp lip is yieldably supported in the extended position only as long as the weight of the ramp lip is transmitted through the telescoping spring assembly; therefore, the ramp lip is not yieldably supported once the ramp lip rests upon the bed of a truck or the like.

Accordingly, it is an object and feature of this invention to provide a dockboard having a ramp lip which is yieldably supported in an extended cantilevered position by actuation means which maintains the yieldable support until the ramp is pivoted to a predetermined fixed position.

Another object and feature of this invention is to provide a dockboard having actuation means for yieldably supporting a ramp lip in an extended cantilevered position whereby the ramp lip is yieldably supported in the extended cantilevered position for unloading and loading one truck after another so long as the ramp is not pivoted to a fixed position below dock level.

A further object and feature of this invention is to provide a dockboard including actuation means for yieldably supporting a ramp lip in an extended cantilevered position during all pivotal movements of the ramp except when the ramp pivots to a fixed position below dock level where the actuation means automatically unlocks the ramp lip from the extended cantilevered position and the ramp lip pivots toward the pendent position as the ramp automatically returns to the dock level position.

In general, these and other objects and features of this invention may be attained by a dockboard which includes a support structure, a ramp pivotally connected at one end thereof to the support structure, a ramp lip pivotally connected to the second end of the ramp of movement between a pendent position and an extended cantilevered position, and actuation means for yieldably locking the ramp lip in the extended cantilevered position so that the ramp lip may pivot toward the pendent position when a predetermined force is applied thereto and for unlocking the ramp lip when the ramp pivots to a position which is fixed. The actuation means includes a link connected at one end thereof to the ramp lip, a mount suspended from the ramp, a pivot arm pivotally connected at a first end thereof to the mount, a shaft connected to the second end of the pivot arm with the link pivotally connected at the second end thereof to the shaft, and a locking arm pivotally connected at a first end thereof to the shaft and having a recess in the second end thereof for engaging a pin disposed on the mount. Depending upon the preferred embodiment utilized, either the link, the locking arm, or the pin is yieldable to allow the ramp lip to pivot toward the pendent position when a predetermined force is applied thereto. The actuation means also includes a cam rotatably connected to the mount and engageable with the shaft to move the lamp lip to the extended cantilevered position upon rotation of the cam. A lift arm is pivotally connected at one end to the support structure and engages the cam at the other end. A biasing means is attached at one end to the lift arm and is operatively connected at the other end to either the support structure or the ramp for urging the lift arm to pivot to raise the ramp and to pivot the ramp lip to the extended cantilevered position.

Other objects and attendant advantages of the present invention will be readily appreciated as the same becomes better understood by reference to the following detailed description when considered in connection with the accompanying drawings wherein.

Figure 1:
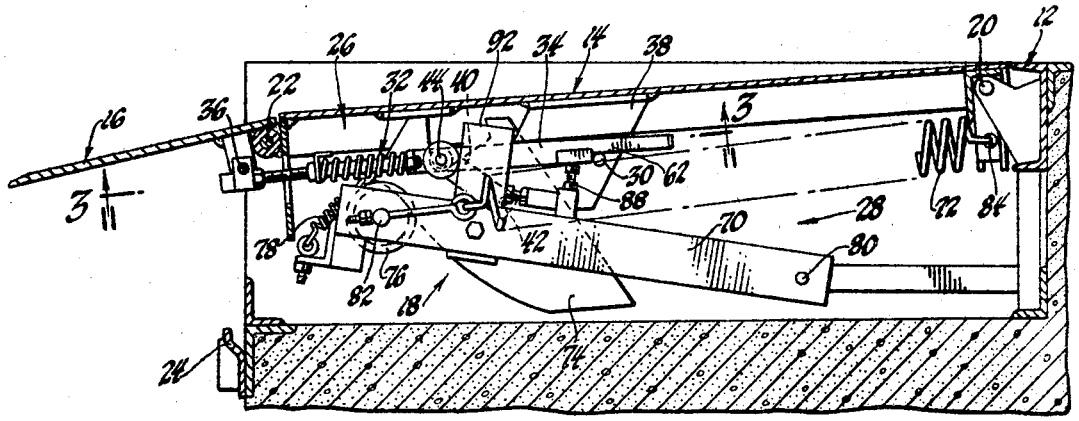
FIGURE 1 is a side elevational view partially in cross section of a preferred embodiment of the instant invention with the ramp lip yieldably supported in the extended cantilevered position.

Referring now to the drawings wherein like numerals indicate like or corresponding parts throughout the several views, three preferred embodiments of the instant invention are illustrated and each embodiment comprises a support structure, generally indicated at 12, a ramp, generally indicated at 14, a ramp lip, generally indicated at 16, and actuation means, generally indicated at 18.

Figure 4:
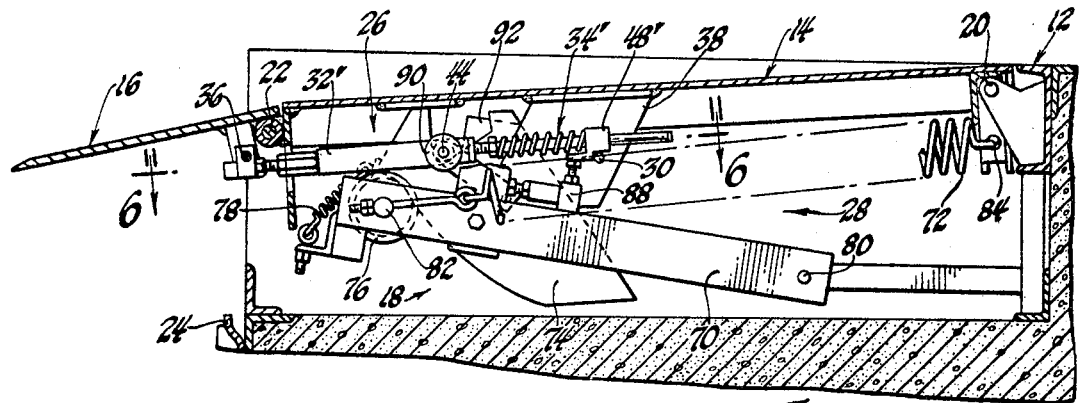
FIGURE 4 is a side elevational view partially in cross section of another preferred embodiment of the instant invention with the ramp lip yieldably supported in the extended cantilevered position.
Figure 7:
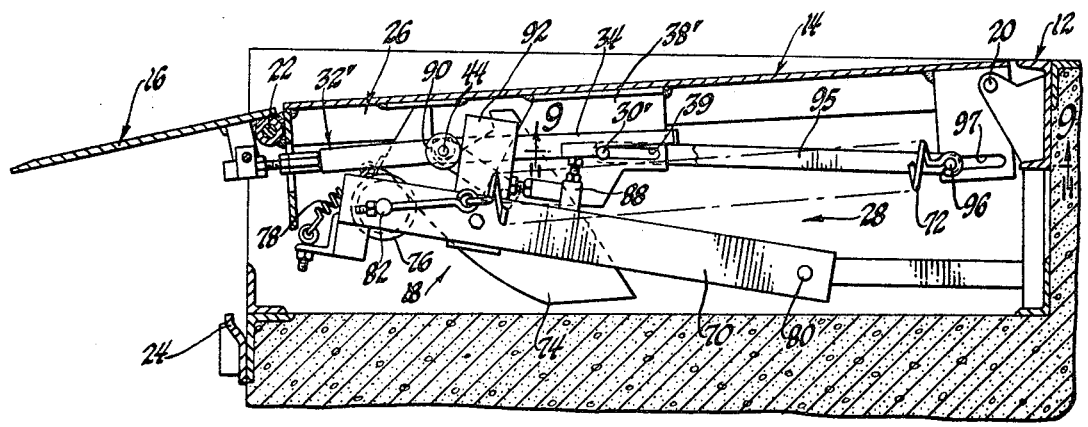
FIGURE 7 is a side elevational view partially in cross section of still another preferred embodiment of the instant invention with the ramp lip yieldably supported in the extended cantilevered position.

The ramp 14 is pivotally connected at a first end through the pin 20 to the support structure 12 for pivotal movement from a first extreme upward position, to an intermediate position, to a dock level position, to a second extreme lower position, and vice versa. The ramp lip 16 is pivotally connected through the hinge 22 to the second end of the ramp 14 for movement between a pendent position and an extended cantilevered position. The extended cantilevered position is shown in FIGURES 1, 4 and 7 respectively, and the pendent position (not shown) is the position where the ramp lip 16 is disposed substantially at right angles to the ramp 14. The ramp 14 is at the dock level position when it is disposed substantially horizontally. The ramp lip 16 engages the support means 24 to support the ramp 14 in the dock level position when the dockboard is not in use. The actuation means 18 yieldably locks the ramp lip 16 in the extended cantilevered position so that the ramp lip 16 may pivot toward the pendent position when a predetermined force is applied thereto and also unlocks the ramp lip 16 when the ramp 14 pivots to a predetermined position which is fixed and below the dock level position.

The actuation means 18 includes the ramp lip operating means, generally shown at 26, and lift means, generally shown at 28. The ramp lip operating means 26 is operatively connected to the ramp lip 16 for pivoting the ramp lip 16 from the pendent position to yieldably lock the ramp lip 16 in the extended cantilevered position as the ramp 14 pivots, and also automatically unlocks the ramp lip 16 from the extended cantilevered position when the ramp 14 reaches the fixed position, which is below the dock level position. The lift means 28 operatively interconnects the support structure 12, the ramp 14, and the ramp lip operating means 26 for applying a variable moment to pivot the ramp 14 in a first direction upward to the first extreme upward position when the ramp is disposed on a first side of the intermediate position and allows unaided pivotal movement of the ramp 14 in a second direction downward when the ramp 14 is disposed on the second side of the intermediate position, and also varies the moment when the ramp is positioned on the second side of the intermediate position to pivot the ramp 14 through a predetermined sequence of pivotal movements to automatically return the ramp 14 to the dock level position. The intermediate position is above the dock level position and is a position where the variable moment applied by the lift means equals the countermoment caused by the weight of the ramp as a result of gravity. That is to say, the ramp 14 may be moved to the intermediate position whereat the moment urging the ramp 14 to pivot upwardly equals the countermoment resulting from gravity which urges the ramp 14 to pivot downwardly. Thus, the ramp 14 may be moved to the intermediate position and will remain there, whereas, in the event the ramp 14 is moved upwardly above the intermediate position, the lift means 28 will pivot the ramp 14 upwardly to the upward extreme position, and in the event the ramp 14 is pivoted to a position below the intermediate position, the countermoment produced by gravity is greater than the upward moment produced by the lift means 28 and the ramp 14 will pivot in a second direction downwardly.

Figure 2:
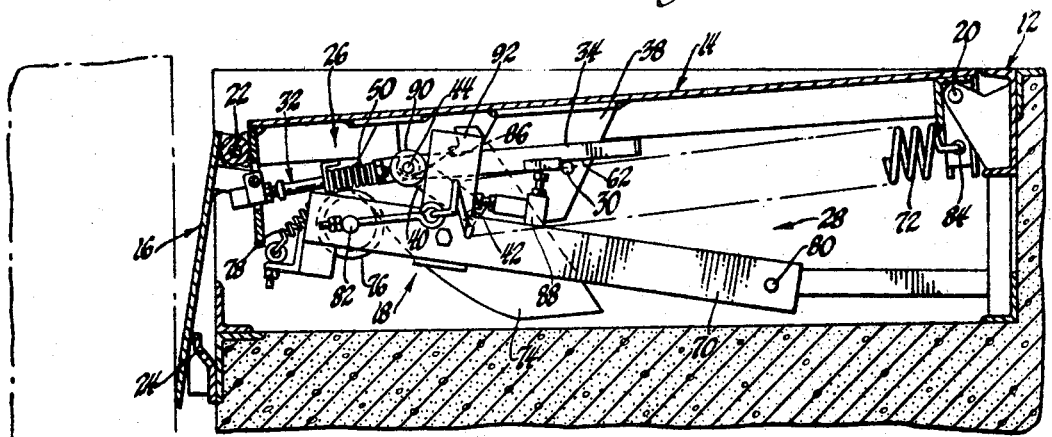
FIGURE 2 is a side elevational view partially in cross section of the embodiment of the invention shown in FIGURE 1 with the ramp lip forced toward the pendent position by a truck shown in phantom.
Figure 3:
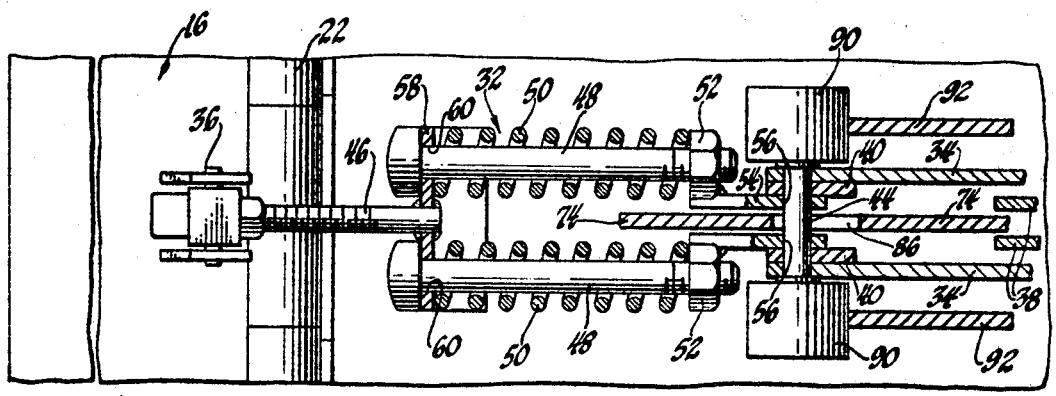
FIGURE 3 is an enlarged cross-sectional view partially broken away and taken substantially along line 3—3 of FIGURE 1.

Turning now specifically to the embodiment disclosed in FIGURES 1 through 3, the ramp lip operating means 26 includes an abutment comprising the pin 30 and linkage means comprising the link, generally indicated at 32, and the locking arm 34. The link 32 and the locking arm 34 are connected to the abutment pin 30 for yieldably locking the ramp lip 16 in the extended cantilevered position, as illustrated in FIGURE 1. The link 32 is operatively connected at a first end through the pin 36 to the ramp lip 16. The linkage means further includes a mount 38 which is suspended from the ramp 14, a pivot arm 40 pivotally connected at a first end through the pin 42 to the mount 38, and a shaft 44 connected to the pivot arm 40. The link 32 is pivotally connected at the second end thereof to the shaft 44, and the locking arm 34 is pivotally connected at one end thereof to the shaft 44. The link 32 comprises two relatively movable elements 46 and 48 with a spring means 50 disposed therebetween so that upon engagement of the locking arm 34 with the abutment pin 30, the ramp lip 16 is yieldably supported in the extended cantilevered position and the elements 46 and 48 relative to one another may move against the force of the spring means 50 when a predetermined force is applied to the ramp lip 16. The element 48 includes bolts threadedly engaging the nuts 52 which are in turn welded to the plates 54. The plates 54 are disposed at 56 on the shaft 44. The element 46 includes the plate 58, which plate 58 has holes 60 therein for slidably receiving the bolts of the element 48. The spring means 50 react between the nuts 52 and the plate 58.

The locking arm 34 is disposed for sliding movement along the abutment pin 30 and includes a cutaway portion 62 to receive the abutment pin 30 for preventing sliding movement of the locking arm 34 in one direction along the abutment pin 30 to maintain the ramp lip 16 in the extended cantilevered position, as illustrated in FIGURE 1. The spring means 50 is strong enough to support the ramp lip 16 in the extended cantilevered position when the locking arm 34 engages the abutment pin 30, as illustrated in FIGURE 1. The link 32, therefore, yieldably supports the ramp lip 16 in the extended cantilevered position but allows the ramp lip 16 to pivot toward the pendent position when a predetermined force is applied thereto and, in addition, returns the ramp lip 16 to the extended cantilevered position when the predetermined force is removed therefrom. This is more clearly illustrated in FIGURE 2 wherein a truck, shown in phantom, has engaged the ramp lip 16 and has pivoted the ramp lip 16 toward the pendent position, thus compressing the spring means 50 of the link 32, and as the truck moves away from the dockboard, the spring means 50 will expand to return the ramp lip 16 to the extended cantilevered position. The spring means 50 of the link 32, therefore, coacts with the elements 46 and 48 so that, when the cutaway portion 62 is disposed on the abutment pin 30 to lock the ramp lip 16 in the extended cantilevered position, the elements 46 and 48 move relative to one another against the force of the spring means 50 as a predetermined force is applied to the ramp lip 16 whereby the ramp lip 16 is yieldably supported in the extended cantilevered position.

All three of the preferred embodiments illustrated includes a lift means 28 comprising a lift arm 70, biasing means comprising the springs 72, a cam 74, a cam follower 76, and a cam rotating means comprising the spring 78. The lift arm 70 is pivotally connected at one end through the pin 80 to the support structure 12. The biasing means 72 is attached at one end 82 to the lift arm 70 and is operatively connected at the other end in the embodiments of FIGURES 1 through 6, to the ramp 14 at 84. The biasing means 72 urges the lift arm 70 to pivot in a first direction upward. The cam 74 is rotably connected through the pin 42 to the mount 38 and the cam 74 may be rotated when the ramp is in a fixed position to vary the magnitude of the moment tending to urge the ramp to pivot upwardly. The cam follower 76 is rotatably disposed on the end of the lift arm 70 for engaging the cam 74. The cam rotating means comprising the springs 78 interconnects the cam 74 and the lift arm 70 for rotating the cam 74 upon pivotal movement of the lift arm 70. The cam 74 has a portion 86 for engaging the shaft 44 to pivot the ramp lip 16 to the extended cantilevered position as the ramp 14 pivots in a first direction upward from the dock level position. That is to say, as the ramp 14 is pivoted upward from the dock level position, the cam follower 76 moves along the cam 74 and the cam 74 is rotated by the action of the spring 78 and the moment applied thereto through the cam follower 76. As the cam 74 rotates, the portion 86 engages the shaft 44 to pivot the ramp lip 16 to the extended cantilevered position so that the cutaway portion of the locking arm receives the abutment pin for locking the ramp lip 16 in the extended cantilevered position.

Each embodiment illustrated also includes a stop means 88 which extends from the lift arm 70 for engaging the locking arm of the linkage means to move the cutaway portion away from the abutment pin when the ramp is pivoted in the second direction downward to a fixed position below dock level to automatically unlock the ramp lip 16 whereby the ramp lip 16 is free to pivot toward the pendent position. That is to say, the stop means 88 engages the locking arm 34, as illustrated in FIGURE 1, when the ramp 14 is pivoted downward to a predetermined fixed position below dock level. The fixed position is set and depends upon the distance the stop means 88 extends from the lift arm 70 and for adjusting this distance the stop means 88 includes a bolt extending from and threadedly engaging a fixed nut.

The lip operating means 26 of each embodiment also includes force transmitting means for transmitting the force caused by the weight of the ramp lip 16 to the lift means 28 when the ramp lip 16 is unlocked from the extended cantilevered position for applying an additional moment to the lift means 28 as the ramp lip 16 pivots toward the pendent position to pivot the ramp 14 in the first direction upward toward the intermediate position and for terminating the additional moment when the ramp lip 16 reaches the pendent position so that the ramp 14 pivots in the second direction downward to the dock level position. The force transmitting means includes the rollers 90 and the force plates 92. The rollers 90 are disposed on the shaft 44, and the force plates 92 extend from the lift arm 70 for receiving forces transmitted thereto by the rollers 90 as the ramp lip 16 pivots toward the pendent position to provide the additional moment to pivot the ramp in the first direction upward toward the intermediate position. That is to say, when the ramp lip 16 is disposed on the bed of a truck and the truck moves away, the ramp 14 automatically returns to the dock level position because the ramp 14 pivots downward and the stop means 88 engages the locking arm to unlock the ramp lip 16 so that the ramp lip 16 pivots toward the pendent position. And as the ramp lip 16 pivots toward the pendent position, the rollers 90 engage the force plates 92 to transmit the weight of the ramp lip 16 to the lift arm 70 thereby causing the ramp 14 to pivot upwardly until the ramp lip 16 is in the pendent position and the rollers 90 have disengaged the top of the force plates 92. When the ramp lip 16 reaches the pendent position and the rollers 90 have disengaged the force plates 92, the ramp 14 pivots downwardly to engage the ramp lip 16 in the support means 24 whereby the dockboard is supported in the dock level position.

Figure 5:
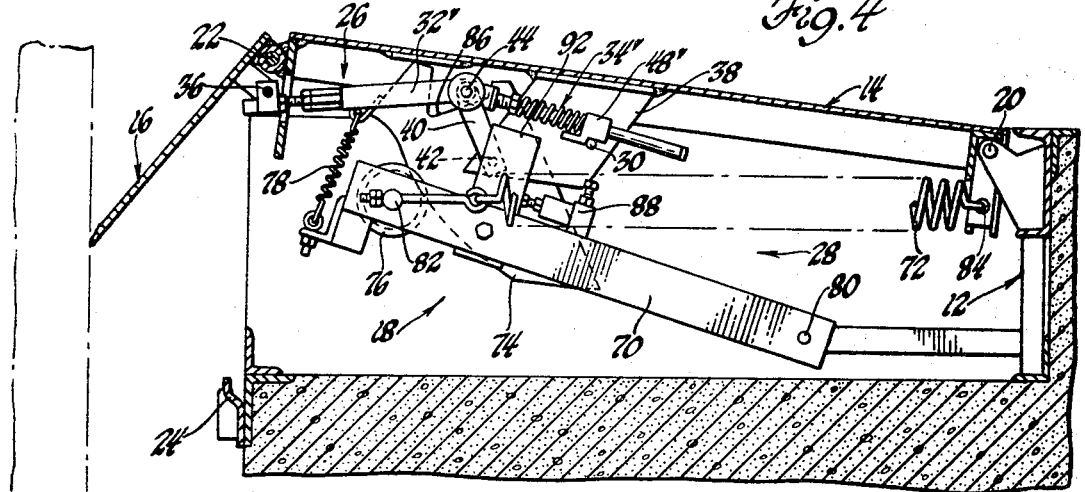
FIGURE 5 is a side elevational view partially in cross section of the embodiment of the invention shown in FIGURE 4 with the ramp lip forced toward the pendent position by a truck shown in phantom.
Figure 6:
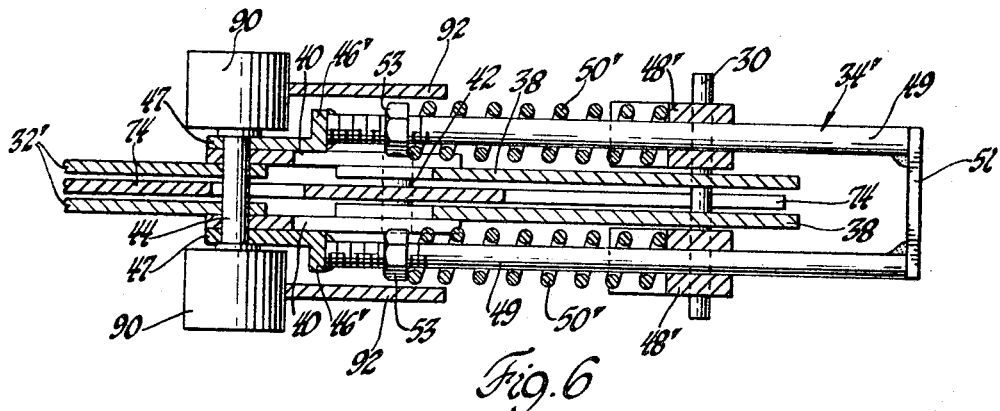
FIGURE 6 is an enlarged cross-sectional view partially broken away and taken substantially along line 6—6 of FIGURE 4.

Referring now more specifically to the preferred embodiment illustrated in FIGURES 4 through 6, the ramp lip operating means 26 thereof also includes an abutment pin 30, but the linkage means thereof includes the link 32' and the locking arm, generally indicated at 34'; thus, all elements in the embodiment disclosed in FIGURES 4 through 6 are the same as the corresponding elements in the embodiment disclosed in FIGURES 1 through 3 except the link 32' and the locking arm 34'.

The locking arm 34' includes two relatively movable elements 46' and 48' with the spring means 50' disposed therebetween. The element 48' has a cutaway portion for receiving the abutment pin 30. Upon dogging engagement of the element 48' with the abutment pin 30, the ramp lip 16 is yieldably supported in the extended cantilevered position. The elements 46' and 48' move relative to one another against the force of the spring means 50' when a predetermined force is applied to the ramp lip 16, as by the truck indicated in phantom in FIGURE 5. Therefore, in the event the ramp lip 16 is locked in the extended cantilevered position, as illustrated in FIGURE 4, and a truck backs thereinto to rotate the ramp lip 16 toward the pendent position, as illustrated in FIGURE 5, the spring means 50' will compress between the elements 46' and 48'. The element 46' includes a pair of plates 47 which are welded to the ends of the rods 49, which rods 49 are slidably disposed in the elements 48' and are interconnected at the ends thereof by the welded brace 51. The nut 53 threadedly engages the rods 49 and the spring means 50' are disposed between the nuts 53 and the element 48'.

Assuming that a truck engages the forward extending end of the ramp lip 16 illustrated in FIGURE 4 and forces the ramp lip 16 to pivot toward the pendent position, it will be evident that the rollers 90 move along the force plates 92 and force the ramp 14 to pivot in the first direction upwardly. Thus, the ramp lip 16 and ramp 14 will be moved to the jackknifed position illustrated in FIGURE 5 as the ramp lip 16 is forced toward the pendent position.

Figure 8:
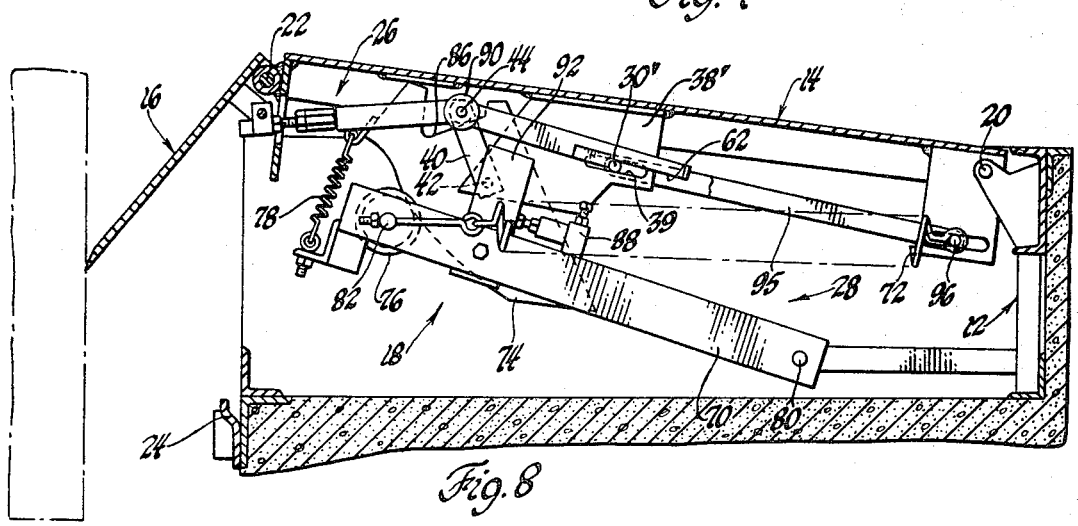
FIGURE 8 is a side elevational view partially in cross section of the embodiment of the invention shown in FIGURE 7 with the ramp lip forced toward the pendent position by a truck shown in phantom.
Figure 9:
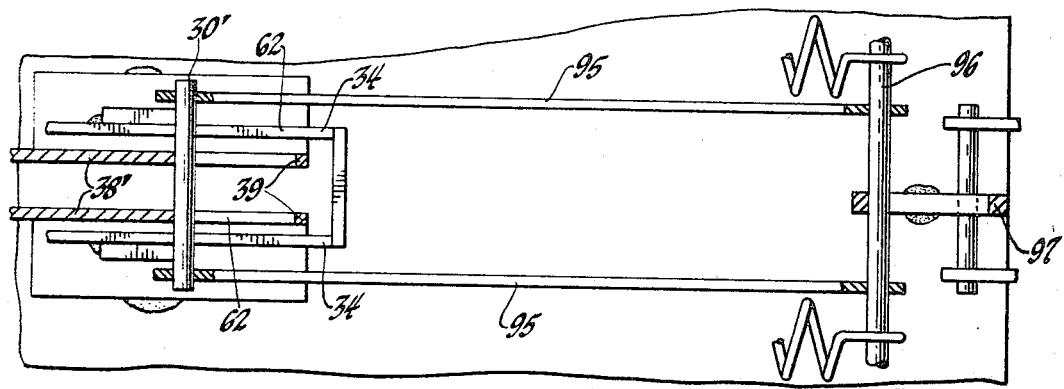
FIGURE 9 is an enlarged cross-sectional view partially broken away and taken substantially along line 9—9 of FIGURE 7.

Referring now more specifically to the preferred embodiment illustrated in FIGURES 7 through 9, it is evident from the illustration thereof that the embodiment illustrated in FIGURES 7 through 9 utilizes a ramp lip operating means 26 including a link 32' which is the same as the link 32' utilized in the embodiment of FIGURES 4 through 6, and a locking arm 34, which is the same as the locking arm 34 utilized in the embodiment illustrated in FIGURES 1 through 3. The embodiment illustrated in FIGURES 7 through 9 differs from the first two embodiments described in that it utilizes a mount 38' having a slot 39 therein and an abutment pin 30' which is slidably disposed in the slot 39. The pin 30' is connected to the rods 95, which are in turn connected to the pin 96. The pin 96 is slidably disposed in the slot 97, and one end of the springs of the biasing means 72 is attached to the pin 96. The biasing means 72, therefore, acts through the pin 96 and the rods 95 to urge the pin 30' toward one end of the slot 39. Upon the disposition of the cutaway portion 62 of the locking arm 34 on the pin 30', the ramp lip 16 is yieldably supported in the extended cantilevered position, yet the pin 30' moves against the force of the biasing means 72 when a predetermined force is applied to the ramp lip 16. It is to be understood, of course, that instead of attaching the biasing means 72 to the pin 96, the biasing means 72 may be attached to the ramp 14, as in the embodiments illustrated in FIGURES 1 through 6, and a separate spring means may be utilized to bias either the pin 96 or the pin 30' in a forward direction to yieldably support the ramp lip 16 in the extended cantilevered position.

The ramp lip 16 in the embodiment illustrated in FIGURES 7 through 9 is yieldably supported in the extended cantilevered position when the locking arm 34 is in dogged engagement with the pin 30'; however, in the event a truck, or the like, engages the ramp lip 16 to force the ramp lip 16 toward the pendent position, the pin 30' is forced rearwardly in the slot 39 to move the rods 95 rearwardly, which in turn moves the pin 96 against the biasing action of the biasing means 72. When the truck moves away from the dockboard, the biasing means 72 moves the pin 30' forwardly to return the ramp lip 16 to the extended cantilevered position. In the embodiment illustrated in FIGURES 7 through 9, as in the embodiment illustrated in FIGURES 4 through 6, the rollers 90 engage the force plates 92 to pivot the ramp 14 upwardly as the ramp lip 16 is forced toward the pendent position, thus jackknifing the ramp 14 and ramp lip 16.

In addition, all three embodiments of the invention illustrated may utilize a manual control means to engage the locking arm for manually unlocking the ramp lip in any pivotal position of the ramp, thus providing a manual override for the automatic unlocking feature of the invention.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A dockboard for a loading dock comprising: a support structure; a ramp pivotally connected at a first end thereof to said support structure for upward and downward pivotal movement on either side of a dock level position; a ramp lip pivotally connected to the second end of said ramp for movement between a pendent position and an extended cantilevered position; actuation means for locking said ramp lip in said extended cantilevered position and including an abutment disposed on said ramp; linkage means operatively connected to said ramp lip and engageable with said abutment, one of said linkage means and said abutment being yieldable for yieldably locking said ramp lip in said extended cantilevered position so that said ramp lip may pivot toward said pendent position in response to a predetermined force applied thereto and return to said extended cantilevered position when said force is removed therefrom; and means for disengaging said linkage means from said abutment when said ramp pivots to a predetermined fixed position to unlock said ramp lip whereby said ramp lip remains locked in said extended cantilevered position during all movement of said ramp until said ramp is moved to said predetermined position.

2. A dockboard as set forth in claim 1 wherein said linkage means is yieldable to allow said ramp lip to pivot toward said pendent position when said predetermined force is applied thereto.

3. A dockboard as set forth in claim 2 wherein said linkage means includes at least one link comprising two relatively movable elements with a spring means disposed therebetween so that upon engagement of said linkage means with said abutment to yieldably support said ramp lip in said extended cantilevered position, said elements will move against the force of said spring means when said predetermined force is applied to said ramp lip.

4. A dockboard as set forth in claim 3 wherein said means for disengaging said linkage means is a stop means for disengaging said linkage means from said abutment when said ramp reaches said fixed position which is at the extreme downward position in the movement of said ramp.

5. A dockboard as set forth in claim 1 wherein said abutment is yieldably mounted on said ramp for movement between first and second positions.

6. A dockboard as set forth in claim 5 including spring means urging said abutment toward said first position so that, upon engagement of said linkage means with said abutment to yieldably lock said ramp lip in said extended cantilevered position, said abutment will move toward said second position when said predetermined force is applied to said ramp lip.

7. A dockboard as set forth in claim 6 wherein said means for disengaging said linkage means is a stop means for disengaging said linkage means from said abutment when said ramp reaches said fixed position which is at the extreme downward position in the movement of said ramp.

8. A dockboard as set forth in claim 1 wherein said linkage means includes: a link operatively connected at a first end thereof to said ramp lip and a locking arm; a mount supported from the underside of said ramp; a pivot arm pivotally connected at a first end thereof to said mount; a shaft connected to the second end of said pivot arm; said link pivotally connected at the second end thereof to said shaft; said locking arm pivotally connected at a first end thereof to said shaft; and said abutment comprises a pin disposed on said mount; said locking arm being disposed for sliding movement along said pin and having a cutaway portion to receive said pin for preventing sliding movement of said locking arm in one direction along said pin to maintain said ramp lip in said extended cantilevered position; one of said link, said locking arm, and said pin being yieldable to allow said ramp lip to pivot toward said pendent position when said predetermined force is applied thereto and to return said ramp lip to said extended cantilevered position when said predetermined force is removed therefrom.

9. A dockboard as set forth in claim 8 wherein one of said link and said locking arm comprises at least two elements which are movable relative to one another, spring means coacting with said elements so that, when said cutaway portion is disposed on said pin to lock said ramp lip in said extended cantilevered position, said elements move relative to one another against the force of said spring means when said predetermined force is applied to said ramp lip whereby said ramp lip is yieldably supported in said extended cantilevered position.

10. A dockboard as set forth in claim 8 wherein said pin is movably disposed in a slot in said mount, and spring means coacts with said pin to urge said pin toward one end of said slot so that, upon the disposition of said cutaway portion on said pin to lock said ramp lip in said extended cantilevered position, said pin moves against the force of said spring means when said predetermined force is applied to said ramp lip whereby said ramp lip is yieldably supported in said extended cantilevered position.

11. A dockboard as set forth in claim 8 including a lift arm pivotally connected at a first end thereof to said support structure, and biasing means attached at a first end thereof to said lift arm and operatively connected at the second end thereof to one of said support structure and said ramp for urging said lift arm to pivot in said first direction.

12. A dockboard as set forth in claim 11 wherein said pin is movably disposed in a slot in said mount, and said second end of said bisasing means is operatively connected to said pin to urge said pin toward one end of said slot thereby to operatively connect said second end of said biasing means to said ramp.

13. A dockboard as set forth in claim 11 wherein said means for unlocking said ramp lip includes stop means extending from said lift arm for engaging said locking arm to move said cutaway portion away from said pin when said ramp is pivoted in said second direction to said fixed position to automatically unlock said ramp lip so that said ramp lip may pivot toward said pendent position.

14. A dockboard as set forth in claim 13 including a cam rotatably connected to said mount, a cam follower disposed on the second end of said lift arm for engaging said cam, and cam rotating means interconnecting said cam and said lift arm for rotating said cam upon pivotal movement of said lift arm, said cam including a portion for engaging said shaft to pivot said ramp lip to said extended cantilevered position as said ramp pivots, at least one roller disposed on said shaft, at least one force plate extending from said lift arm for receiving forces transmitted thereto by said roller as said ramp lip pivots toward said pendent position to provide an additional moment to pivot said ramp upwardly.

15. A dockboard as set forth in claim 14 wherein one of said link and said locking arm comprises at least two relatively movable elements, and spring means coacting with said elements so that when said cutaway portion is disposed on said pin to lock said ramp lip in said extended cantilevered position said elements move relative to one another against the action of said spring means when said predetermined force is applied to said ramp lip whereby said ramp lip is yieldably supported in said extended cantilevered position.

16. A dockboard as set forth in claim 14 wherein said pin is movably disposed in a slot in said mount, and spring means coacts with said pin to urge said pin toward one end of said slot so that upon the disposition of said cutaway portion on said pin to lock said ramp lip in said extended cantilevered position said pin moves against the action of said spring means when said predetermined force is applied to said ramp lip whereby said ramp lip is yieldably supported in said extended cantilevered position.

17. A dockboard as set forth in claim 14 wherein said pin is movably disposed in a slot in said mount, and said second end of said biasing means is operatively connected to said pin to act as said spring means to urge said pin toward one end of said slot thereby to operatively connect said second end of said biasing means to said ramp and whereby said ramp lip is yieldably supported in said extended cantilevered position.

References Cited

UNITED STATES PATENTS

| | | | |
|---|---|---|---|
| 3,203,002 | 8/1965 | McGuire | 14—71 |
| 3,316,575 | 5/1967 | Larsen | 14—71 |
| 3,235,896 | 2/1966 | Riggs | 14—71 |
| 3,280,414 | 10/1966 | Layne | 14—71 |
| 3,327,335 | 6/1967 | Beckwith et al. | 14—71 |

JACOB L. NACKENOFF, *Primary Examiner.*